Patented June 24, 1941

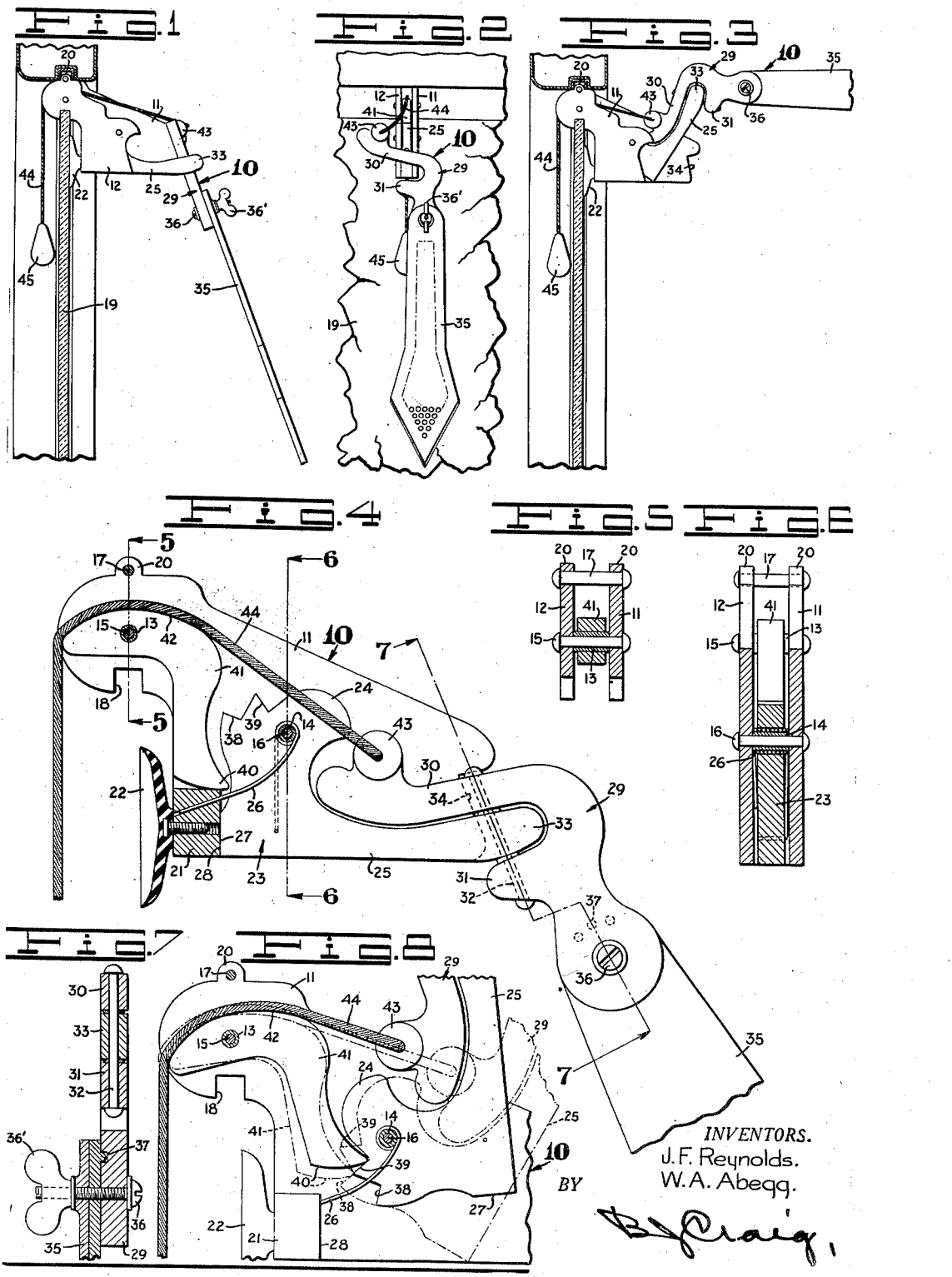

2,246,637

UNITED STATES PATENT OFFICE 2,246,637

SIGNAL

John F. Reynolds, Pasadena, and Walter A. Abegg, Los Angeles, Calif.

Application November 16, 1940, Serial No. 365,876

10 Claims. (Cl. 116—51)

This invention relates to signals.

The general object of the invention is to provide a convenient, readily removable signal for use on motor vehicles and which operates in a novel manner.

The usual automobile signal comprises a device which is stationary and is fixed on the vehicle and for this reason is objectionable as it is in the way and presents an unsightly appearance. Our present invention relates to a movable signal which is intended to be used only when the weather is inclement and when it is disagreeable to use the hand for signaling. In good weather our signal is tucked away in the glove compartment when not in use and when required it is quickly installed.

A more specific object of our invention is to provide a signal having novel means for holding the same in the window portion of a motor vehicle.

Another object of the invention is to provide a signal including a pivoted arm with novel means for mounting the arm upon a support.

An additional object of the invention is to provide a signal wherein a signal arm is mounted in novel manner for both pivoting and swiveling action.

A further object of the invention is to provide a novel mounting for a signal arm.

Other objects and advantages of the invention will be apparent from the following specification taken in connection with the accompanying drawing, wherein:

Fig. 1 is a side elevation partly in section showing our signal;

Fig. 2 is a front view of the signal;

Fig. 3 is a view similar to Fig. 1, showing the parts in another position;

Fig. 4 is a side elevation on an enlarged scale with parts broken away and with parts in section;

Figs. 5, 6, and 7 are sections taken on lines 5—5, 6—6, and 7—7, Fig. 4 respectively; and Fig. 8 is a side elevation with parts broken away and with parts in section showing the signal in other positions.

Referring to the drawing by reference characters we have shown our invention as embodied in a signal device which is indicated generally at 10.

As shown the device includes a support including a front member 11 and a rear member 12 which are spaced apart by sleeves 13 and 14 through which rivets 15 and 16 extend. When the rivets 15 and 16 are secured in place the members 11 and 12 will be held in spaced apart relation.

The members 11 and 12 are further connected by a rivet 17 which serves as a cord guide to be later described.

The members 11 and 12 are provided with aligned notches 18 which receive the slidable window glass 19 of a vehicle, while aligned bosses 20 on the members 11 and 12 are adapted to go into the window groove so that when the glass 19 is raised the signal will be supported. In order to steady the signal a block 21 is provided on the member 12 and on this block 21 we mount a rubber suction cup 22 which engages the window and serves to cushion the signal.

The sleeve 14 pivotally supports a support arm 23 which includes an upper portion 24 and a lateral portion 25. A spring 26 normally urges the support arm 23 to the positions shown in Figs. 1, 2, 3, and 4 when it will be noted that the end 27 of the arm engages the face 28 of the block 21.

A signal arm 29 includes spaced portions 30 and 31 which are arranged on each side of the lateral portion 25 of the support arm and these portions 30 and 31 are pivotally connected to the support arm by a rivet 32. The outer end of the portion 25 tilts upwardly as at 33 and the pin 32 is inclined so that the natural tendency for the signal arm is to turn to the position shown in Figs. 1 and 2 wherein the plane of the signal arm is at right angles to the planes of the members 11 and 12 and the signal arm in this position engages a shoulder 34 on the end of the member 11.

A signal member 35 is pivotally mounted on the signal arm 29 by a bolt 36 and clamped thereto by a wing nut 36'. Suitable pin and socket members 37 are provided for the adjustment of the angular position of the signal member 35 on the signal arm 29.

When not in use the wing nut 36' may be released and the signal collapsed so that it may be stored in the glove compartment of the vehicle ready for use when desired.

The upper portion 24 of the support arm 23 includes a pair of toothed portions 38 and 39 in the rear of the sleeve 14 which are adapted to be engaged by a tooth portion 40 of a dog member 41 to retain it in two adjusted positions.

The dog member 41 is pivotally mounted on the sleeve 13 and includes an arcuate upper surface 42. The signal arm 29 adjacent the rear thereof includes a boss 43 to which a cord 44 is secured.

The cord 44 is positioned between the front and rear members 11 and 12 and engages the arcuate surface 42 of the dog 41 and extends downward a predetermined distance and has a handle member 45 thereon.

In operation when an operator desires to make a stop signal he pulls the cord 44 which turns the signal arm 29 about the pivot 32 from the position shown in Figs. 1 and 2 to the position shown in Fig. 4. When the operator releases the cord 44 the signal arm returns to the position shown in Figs. 1 and 2 of its own accord as previously described.

To make a left hand turn signal as shown in Fig. 3 the operator pulls the cord 44 whereupon the signal arm 29 turns to the position shown in Figs. 1 and 2 and upon further pulling of the cord the signal arm 29 and the support arm 23 pivot on the sleeve 14 and swing upwardly until the toothed portion 38 is below the dog tooth 40.

When the cord 44 is pulled it exerts a pressure on the dog 41 which urges the dog tooth 40 into engagement with the support arm 23 so that when the tooth portion 38 thereof passes the tip of the tooth 40 the tooth moves forwardly as indicated by the broken lines in Fig. 8. Whereafter the cord is released and the tooth 40 of the dog 41 retains the support arm 23 in the position to which it has been moved.

To return the signal arm to its initial downwardly inclined position the operator pulls the cord 44 straight inwardly and out of engagement with the dog 41. This swings the support arm 23 upwardly a slight distance thus moving engaged tooth 38 out of engagement with the dog tooth 40 so that the dog swings downwardly whereupon the weight of the support arm 23 and the signal arm 29 swing them downwardly to their initial position as shown in Figs. 1 and 2.

When the cord 44 is pulled and released the rivet 17 prevents the cord from jumping from between the front and rear plates 11 and 12.

To make a right hand turn signal the operator pulls the cord 44 the same as for a left turn signal but instead of stopping the support arm 23 at the stop 38 he continues to pull the cord until the stop 39 is below the dog post 40 whereupon the dog post swings forwardly and upon releasing of the cord retains the support arm 23 in position as shown in the full line position in Fig. 8.

The support arm 23 is released from the position shown in Fig. 8 in the same manner as previously described in connection with the left turn signal operation.

From the foregoing description it will be apparent that we have invented a novel signal which can be economically manufactured and which is highly efficient in use.

Having thus described our invention, we claim:

1. In a signal, a support, a support arm pivotally mounted on said support, a signal arm pivoted on the support arm on a pivot the axis of which is at right angles to the axis of the support arm, said signal arm including a signal member, means normally urging said support arm downwardly, a dog pivoted to said support, coacting means in the dog and support arm to hold said support arm in vertically adjusted signaling position, and means for moving said support arm.

2. In a signal, a support including a pair of members, spaced sleeves between said members, bolts passing through said sleeves and said members to hold the members assembled, said members each having a notch therein adjacent one end thereof, said notches being aligned with each other and being adapted to receive a window edge, each of said members having a boss thereon, the bosses being vertically aligned with the notches and being adapted to fit in a window frame groove, and a signal member mounted between said members.

3. In a signal, a support, a support arm pivotally mounted on said support, a signal arm pivoted on the support arm on a pivot the axis of which is at right angles to the axis of the support arm, means to hold said support arm in vertically adjusted signaling position, means for moving said support arm, and a signal member pivotally and adjustably mounted on said signal arm, said signal member being movable to a folded position over the signal arm.

4. In a signal, a support including a pair of members, spaced sleeves between said members, bolts passing through said sleeves and said members to hold the members assembled, said members each having a notch therein adjacent one end thereof, said notches being aligned with each other and being adapted to receive a window edge, each of said members having a boss thereon and being adapted to fit in a window frame groove, the bosses being vertically aligned with the notches, a block on one of the members, a suction cup on the block, said suction cup being substantially aligned with one edge of the notches, and a signal member mounted in said members.

5. In a signal, a support including a pair of spaced members, means in said members to engage a window and its frame, one of the members having an end projecting beyond the other member, a support arm pivotally mounted on said members, said support arm including an upwardly directed portion and a lateral portion, a signal arm having spaced end portions thereon, said end portions being arranged one on each side of said support arm lateral portion and pivotally connected thereto, a signal member on said signal arm, means normally urging said support arm downwardly, said support arm having teeth therein adjacent its pivotal axis, a pendant dog having a tooth on one side and pivotally mounted on the members and movable to engage said support arm teeth, and a cord engaging said signal arm and movable over said dog.

6. In a signal, a support, a support arm pivotally mounted on said support, said support arm including an upwardly directed portion and a lateral portion, a signal arm having spaced end portions thereon, said end portions being arranged one on each side of said support arm lateral portion and pivotally connected thereto, the axis of said member being outwardly and downwardly inclined, a signal member on said signal arm, means normally urging said support arm end downwardly, said support arm having teeth therein adjacent its pivotal axis, a pendant dog having a tooth in one side and pivotally mounted on the support and movable to engage said support arm teeth, and a cord engaging said signal arm and movable over said dog.

7. In a signal, a support including a pair of spaced members, one of the members having an end projecting beyond the other member, a support arm pivotally mounted between said members, said support arm including an upwardly directed portion and a lateral portion, a signal arm having spaced end portions thereon, said end portions being arranged one on each side of said support arm lateral portion and pivotally connected thereto by a pin member, the axis of said member being outwardly and downwardly inclined, a signal member on said signal arm, means normally urging said support arm end downwardly, said support arm having teeth therein adjacent its pivotal axis, a dog having a tooth in one side and pivotally mounted between the members and movable to engage said support arm teeth, said dog being heavier on the toothed side of its pivot than on the other side thereof whereby the dog when free hangs pendant, said arm having a boss thereon, and a cord engaging said boss and movable over said dog.

8. In a signal, a support including a pair of members, means connecting said members, said members each having a notch therein adjacent one end thereof, said notches being aligned, each of said members having a boss thereon, the bosses being aligned with the notches, one of the members having an end projecting beyond the other member, a support arm pivotally mounted between said members, said support arm including an upwardly directed portion and a lateral portion, a signal arm having spaced end portions thereon, said end portions being arranged one on each side of said support arm lateral portion and pivotally connected thereto by a pin member, the axis of said member being outwardly and downwardly inclined, a signal member on said signal arm, said signal arm having an end thereon adjacent said block, resilient means normally urging said support arm downwardly, said support arm having teeth therein adjacent its pivotal axis, a dog having a tooth in one side and pivotally mounted between the members and movable to engage said support arm teeth, said dog being heavier on the toothed side of its pivot than on the other side thereof whereby the dog when free hangs pendant, said arm having a boss thereon, a cord engaging said boss and movable over said dog, said dog having a rounded face engaged by said cord.

9. In a signal, a support including a pair of members, a pair of bolts engaging said members to hold the members assembled, said members each having a notch therein adjacent one end thereof, said notches being aligned, each of said members having a boss thereon, the bosses being aligned with the notches, a block on one of the members, one of the members having an end projecting beyond the other member, a support arm pivotally mounted on one of said bolts, said support arm including an upwardly directed portion and a lateral portion, a signal arm having spaced end portions thereon, said end portions being arranged one on each side of said support arm lateral portion and pivotally connected thereto by a pin member, the axis of said member being outwardly and downwardly inclined, a signal member on said signal arm, said signal arm having an end thereon adjacent said block, resilient means normally urging said support arm end against the block, said support arm having teeth therein adjacent its pivotal axis, a dog having a tooth in one side and pivotally mounted on the other bolt and movable to engage said support arm teeth, said dog being heavier on the toothed side of its pivot than on the other side thereof whereby the dog when free hangs pendant, said signal arm having a boss thereon, a cord engaging said boss and movable over said dog, said dog having a face engaged by said cord.

10. In a signal, a support including a pair of members, spaced sleeves between said members, bolts passing through said sleeves and said members to hold the members assembled, said members each having a notch therein adjacent one end thereof, said notches being aligned, each of said members having a boss thereon, the bosses being aligned with the notches, a block on one of the members, a suction cup on the block, said suction cup being substantially aligned with one edge of the notches, one of the members having an end projecting beyond the other member, a support arm pivotally mounted on one of said sleeves, said support arm including an upwardly directed portion and a lateral portion, a signal arm having spaced end portions thereon, said end portions being arranged one on each side of said support arm lateral portion and pivotally connected thereto by a pin member, the axis of said member being outwardly and downwardly inclined, a signal member releasably connected to said signal arm, said signal arm having an end thereon adjacent said block, resilient means normally urging said support arm end against the block, said support arm having teeth therein adjacent its pivotal axis, a dog having a tooth in one side and pivotally mounted on the other sleeve and movable to engage said support arm teeth, said dog being heavier on the toothed side of its pivot than on the other side thereof whereby the dog when free hangs pendant, said arm having a boss thereon, a cord engaging said boss and movable over said dog, said dog having a rounded face engaged by said cord.

JOHN F. REYNOLDS.
WALTER A. ABEGG.